Oct. 21, 1952    J. H. ANDERSON    2,614,387
INTERMITTENT EXPLOSION UNIT FOR GAS TURBINE PLANTS
Filed Sept. 17, 1946

INVENTOR
James H. Anderson
BY
HIS ATTORNEY.

Patented Oct. 21, 1952

2,614,387

UNITED STATES PATENT OFFICE 2,614,387

INTERMITTENT EXPLOSION UNIT FOR GAS TURBINE PLANTS

James H. Anderson, Easton, Pa., assignor to Ingersoll-Rand Company, New York, N. Y., a corporation of New Jersey Application September 17, 1946, Serial No. 697,465

7 Claims. (Cl. 60—39.65)

This invention relates to turbines, and more particularly to an explosion gas turbine plant wherein the motive fluid is applied to the turbine in the form of intermittent puffs.

One object of the invention is the provision of the gas turbine plant of simplified construction requiring only a minimum number of parts for generating the motive fluid.

Another object is to assure an ample volume of motive fluid of maximum pressure and heat content for driving the turbine.

Further objects will be in part obvious and in part pointed out hereinafter.

Figure 1:
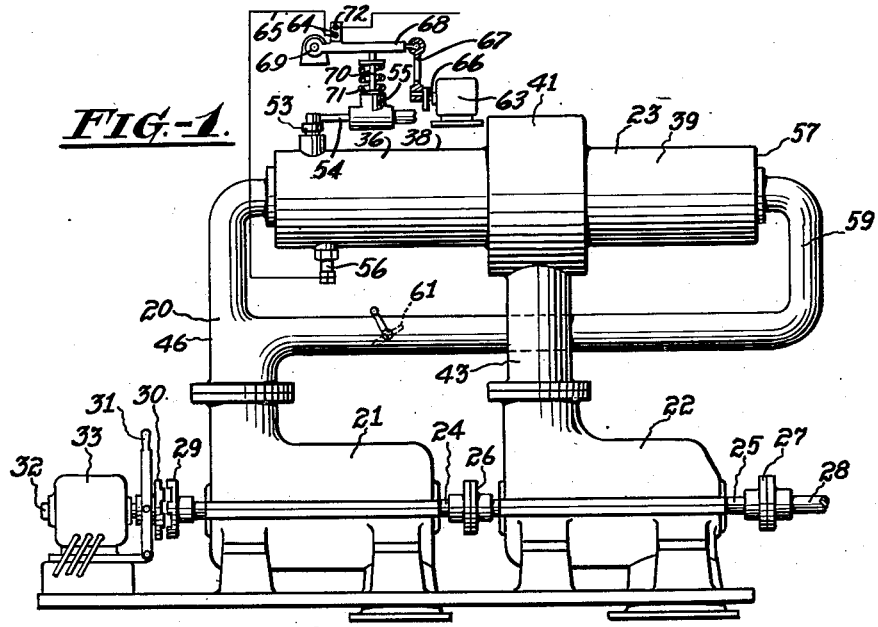
Figure 2:
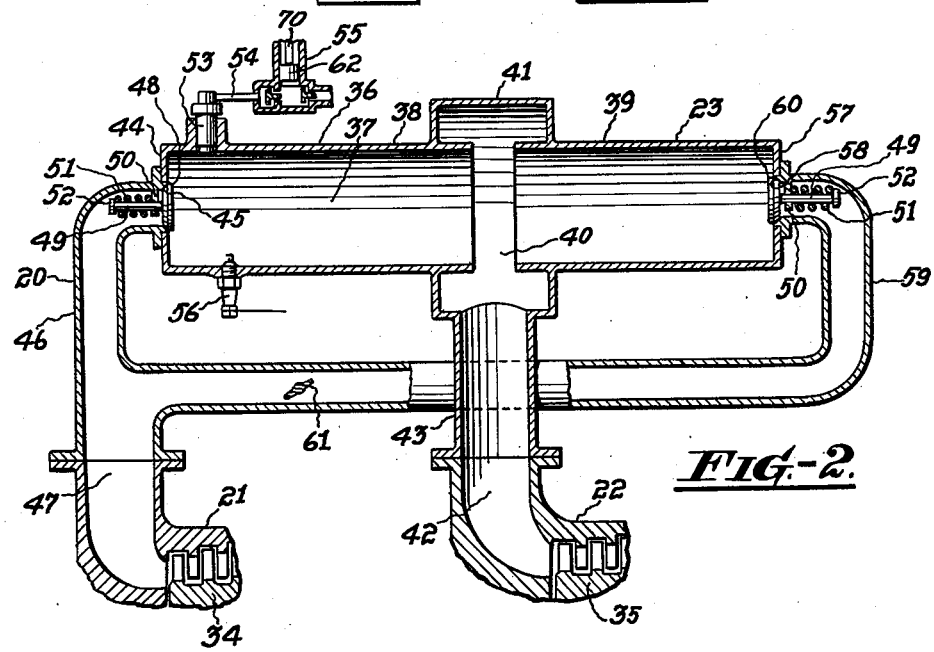

In the drawing accompanying this specification and in which similar reference numerals refer to similar parts, Figure 1 is a longitudinal elevation of an explosion gas turbine plant constructed in accordance with the practice of the invention, and Figure 2 is a longitudinal elevation, partly broken away, of the gas generating element of the plant and fragmentary portions of a turbine and a compressor driven by the turbine.

Referring more particularly to the drawing, the explosion gas turbine plant, designated in general by 20, comprises a compressor 21, a turbine 22 for driving the compressor and a gas generator 23 to supply the gases serving to drive the turbine.

The compressor and the turbine are shown as being of the axial flow types. They are axially aligned with each other and their shafts 24 and 25 are connected together by a coupling 26. The shaft 25 may, as indicated, be connected, by means of a coupling 27, to the shaft 28 of a machine intended to be driven by the turbine.

The outer end of the compressor shaft 24 carries a clutch member 29 for engagement with a complementary member 30 shiftable, as by means of a lever 31, upon the shaft 32 of a motor 33 serving to rotate the rotors 34 and 35 of the compressor and the turbine for supplying the air constituent of the explosive charges to the gas generator 23 at the beginning of an operating period.

The gas generator 23 is shown as being in the form of a cylindrical, elongated casing 36 the interior of which constitutes chamber 37 having an explosion end and a non-explosion end for the propagation of the gases serving to drive the rotative elements of the plant. In a preferred form, the casing 36 consists of two cup-shaped parts 38 and 39 which define, respectively, the explosion and non-explosion sides or end portions of the chamber 37. The parts 38 and 39 are suitably spaced with respect to each other at their opposed ends to provide an outlet 40 therebetween for the passage of the gases from the chamber 37 into a belt 41 encircling the opposed end portions of the parts 38 and 39 and communicating with the inlet opening 42 of the turbine 22 through a conduit 43.

The outer end wall 44 of the casing part 38 has a port 45 for the admission of compressed air into the chamber 37 at a point adjacent one end thereof, such air being conveyed to the port by a conduit 46 leading from a suitable source of compressed air, such as the discharge outlet 47 of the compressor 21. The port 45 is controlled by a valve 48 of the poppet type the stem 49 of which extends slidably through a guide 50 within the conduit 46, and a spring 51 interposed between the guide 50 and a head 52 on the stem 49 constantly urges the valve 48 to its closed position.

The fuel constituent of the explosive charges may be introduced into only the air admitted into the chamber 37 by the port 45 by any suitable means. Such means is illustrated as a spray nozzle 53 in the wall of the casing part 38 having a supply conduit 54 leading from a fuel pump 55, shown as being of the reciprocating plunger type but may be of any other well known intermittently operable type suitable for forcing successive charges of fuel through the nozzle 53. The ignition of the explosive charges is effected by a spark plug 56 mounted in the wall of the casing part 38 and positioned near the end wall 44 and oppositely and slightly inwardly of the nozzle 53. In this position the plug 56 lies in the path of the fuel spray issuing from the nozzle 53. Coordination between the timing of injection of fuel into the chamber 37 and the timing of ignition of the explosive charges may be accomplished in any well known manner. By way of illustration, such coordination and timing may be accomplished by driving the piston 62 of the pump 55 by a variable speed motor 63; and a contact bar 64, also actuated by the motor 63, controls making and breaking of the electrical circuit 65 in which the spark plug 56 is connected.

More particularly, the shaft 66 is eccentrically connected to a crank arm 67 which in turn is pivotedly connected to a rocker arm 68 fulcrumed at 69 and bearing at its intermediate portion against the rod 70 of the piston 62. The motor 63 serves to drive the piston 62 on its working, or downward, stroke, and a spring 71 is arranged to return the piston on its non-working stroke. The contact bar 64 is connected to the spark plug 56 and is mounted on the rocker arm 68 intermediate its ends and is arranged to make contact with a second contact bar 72 connected to a source of power (not shown) at such time in the explosion cycle so as to give the timing relation explained in greater detail hereinafter.

In order that an ample volume of motive fluid may be at all times available for driving the turbine 22 and that the temperature of the motive fluid may be maintained at a value suitable for the turbine, means are provided for introducing into the chamber 37 at a point adjacent the end opposite the explosion end thereof, and during the intervals between explosions, compressed air in excess of that required for supporting combustion. To this end the outer end wall 57 of the casing part 39 is provided with a port 58 that opens into a branch 59 of the conduit 46 and is controlled by a valve 60 similar in all essential respects to the valve 48.

The wall 57 is so spaced with respect to the wall 44 that the distance between them closely approximates one-half or a multiple of one-half of the length of a pressure wave in order that the maximum effect may be obtained from the pressure waves reflected by said walls for compressing the explosive mixtures in the explosion end and the compressed air in the opposite end of the chamber 37. This condition can be substantially obtained by the simple expedient of firing, or igniting, successive charges of fuel and air in the explosion end of the casing part 38 at the time when the peak of the pressure wave caused by the preceding explosion and reflected from the opposite end of the chamber 37, to be explained in greater detail hereinafter, reaches its point of origin, namely the explosion end of the chamber 37. Such a timing relation may be attained in any well known manner, such as by measuring the pressure at the explosion end of the chamber and firing whenever this pressure reaches a maximum.

Preferably, a valve 61 of the butterfly type, and manually operated, is arranged in the conduit 59 to control the flow of compressed air therethrough.

In the operation of the device, and assuming the rotative elements of the plant to be operating at normal speed, compressed air enters the explosion chamber 37 through the ports 45 and 58 and simultaneously therewith fuel is injected through the nozzle 53 into the end of the explosion chamber 37 adjacent the valve 48 and the explosive mixture thus formed is ignited by the spark plug 56. The resulting pressure rise augments the force of the spring 51 to close the valve 48 and the pressure wave travelling through the explosion chamber closes the valve 60. At the time the peak of the pressure wave reaches the valve 60 a pressure of lower value than that in the conduit 46 will exist in the explosion end of the chamber 37. The valve 48 will then be moved to its open position by the pressure in the conduit 46 and compressed air then flows through the port 45 into the explosion chamber and fuel is injected thereinto to form a new charge of explosive mixture. Immediately thereafter, the pressure wave reflected by the end wall 57 will return to its zone of origin and compress said charge prior to its ignition by the spark plug 56.

While thus travelling in the direction of the explosion end of the chamber 37 the pressure wave leaves behind it a wake of lower pressure value than that existing in the branch conduit 59, and the pressure in the conduit 59 will then unseat the valve 60 to admit compressed air into the chamber for further compression by the pressure wave of the next explosion. The motive fluid thus resulting from the explosion gas and the unburned air passes from the explosion chamber through the outlet 40 and the conduit to the turbine for driving its rotor and the parts connected thereto.

The device will continue to operate in the manner described as long as fuel is introduced into the explosion chamber 37. The valves 48 and 60 will operate in accordance with the oscillations of the pressure waves in the explosion chamber to admit compressed air alternately into the opposite ends of the chamber and the pressure waves of the explosions will alternately compress the unburned air in the one end of the chamber and the charges of explosive mixture in the other end.

From the foregoing description it will be readily apparent to those skilled in the art that, owing to the admission of alternate charges of compressed air into the explosion chamber, the explosive mixture may be readily localized. It is, therefore, richer for a given quantity of fuel and produces a higher temperature and pressure than if the fuel were diffused throughout the entire explosion chamber. Moreover, owing to the comparatively low temperature of the unburned air intermingling with the explosion gas in the explosion chamber the temperature of the motive fluid may be readily maintained at a value suitable for the turbine.

I claim:

1. An explosion power unit comprising a casing having a chamber therein with an explosion end and a non-explosion end, said chamber having a length substantially equal to an odd multiple of one-half of an explosion wave length and an outlet for the flow of explosion gas, means for admitting compressed air into the chamber at a point adjacent the explosion end of the chamber, means for introducing fuel into such compressed air only to form an explosive mixture, only means for introducing compressed air into the non-explosion end of the explosion chamber at a point adjacent said non-explosion end, and an ignitor at the explosion end only for causing the explosion of such explosive mixture for increasing the pressure of the compressed air in the chamber.

2. An explosion power unit comprising a casing having an explosion chamber and an outlet at the mid-portion of the casing for the continuous flow of explosion gas therefrom, an inlet for admitting air into the chamber at a point adjacent one end thereof, an inlet valve actuated by the pressure waves resulting from explosions in said chamber for controlling the flow of compressed air through said inlet, a second inlet valve moving in response to pressure waves in the chamber to effect the admission of compressed air into the chamber at a point adjacent the opposite end thereof for compression to a higher pressure value by the pressure waves, means for introducing fuel into only air admitted by said inlet to form an explosive mixture, and an ignitor for the unit at the first said end only of the chamber for igniting the explosive mixture.

3. An explosion power unit comprising a casing having an explosion chamber and an outlet at the mid-portion of the explosion chamber for explosion gas, an inlet valve for admitting charges of compressed air into the explosion chamber on one side of the outlet, means for introducing fuel into only the charges of compressed air admitted by said inlet valve to form an explosive mixture, said explosion chamber having a length substantially half explosion wave length to produce reflected pressure waves in resonance with the motion of the inlet valve for compressing the explosive mixture, a second inlet valve actuated by the pressure waves in the chamber to control the admission of compressed air only into the chamber on another side of the outlet for compression to a higher pressure value by the pressure waves of the explosions in the chamber and to reduce the temperature of the explosion gas, and ignition means on the first said side only for igniting the explosive mixture.

4. An explosion power unit comprising, a casing having an elongated chamber with an explosion end and a non-explosion end and an outlet, inlet valves adjacent the opposite ends of the chamber moving in response to variations in pressure in said chamber for valving compressed air into the opposite end portions of the chamber, a source of compressed air, conduits connecting said valves with said source only, means for introducing fuel into the explosion end only of the chamber to form a localized charge of explosive mixture, said explosion chamber being an odd multiple of one half the length of an explosion pressure wave, and means for causing the explosion of the explosive mixture.

5. An explosion power unit comprising, a casing having an explosion chamber therein, means for periodically forming explosive charges at one end portion only of said chamber, means at the first said end position only for igniting such charges, an outlet for said chamber positioned at substantially an odd multiple of quarter explosion wave length from said end portion of the chamber, and a valve adjacent the opposite end of said chamber for periodically admitting cooling gas thereinto.

6. An explosion power unit comprising, a casing having a chamber therein having an explosion end and a non-explosion end, means for periodically forming explosive charges at the explosion end portion only of said chamber, an ignitor at the explosion end only for igniting such charges, an outlet for said chamber at the mid-portion of the casing, and a cooling-air inlet valve adjacent the non-explosion end of said chamber actuated in response to variations of pressure within said chamber to periodically introduce cooling air into said chamber.

7. An explosion power unit comprising a casing having a chamber therein with an explosion end and a non-explosion end, means for periodically forming explosion charges adjacent the explosion end portion only of said chamber, an ignitor at the explosion end only for igniting said charges, an outlet for said chamber positioned at substantially an odd multiple of one-quarter explosion wave length from the explosion end portion of the chamber, a cooling air inlet opening into said chamber adjacent the non-explosion end thereof for admitting cooling air thereinto, and a valve in said inlet for controlling the flow of air therethrough in accordance with variations in pressure within the chamber at said opposite end thereof.

JAMES H. ANDERSON.

REFERENCES CITED

The following references are of record in the file of this patent:

UNITED STATES PATENTS

| Number | Name | Date |
| --- | --- | --- |
| 2,096,184 | Lasley | Oct. 19, 1937 |
| 2,112,672 | Lasley | Mar. 29, 1938 |
| 2,273,406 | Lasley | Feb. 17, 1942 |
| 2,275,543 | Meyer | Mar. 10, 1942 |
| 2,398,654 | Lubbock | Apr. 16, 1946 |
| 2,425,121 | Peterson | Aug. 5, 1947 |
| 2,480,626 | Bodine | Aug. 30, 1949 |
| 2,493,873 | Hill | Jan. 10, 1950 |
| 2,523,379 | Kollsman | Sept. 26, 1950 |
| 2,546,966 | Bodine | Apr. 3, 1951 |
| 2,550,515 | Anderson | Apr. 24, 1951 |

FOREIGN PATENTS

| Number | Country | Date |
| --- | --- | --- |
| 27,724 | Great Britain | Dec. 16, 1907 |
| 10,047 | Great Britain | Apr. 29, 1913 |
| 176,838 | Great Britain | Mar. 6, 1922 |
| 188,642 | Great Britain | Nov. 29, 1923 |
| 484,289 | Great Britain | May 3, 1938 |
| 574,554 | Great Britain | Jan. 10, 1946 |